United States Patent
Han (10) Patent No.: US 11,858,582 B2
(45) Date of Patent: Jan. 2, 2024

(54) ELECTRIC KICKBOARD INCLUDING IMPACT ABSORBING DEVICE TO SUPPORT WEIGHT OF USER STANDING UP

(71) Applicant: Kyung Hee Han, Yongin-si (KR)

(72) Inventor: Kyung Hee Han, Yongin-si (KR)

( * ) Notice: Subject to any disclaimer, the term of this patent is extended or adjusted under 35 U.S.C. 154(b) by 165 days.

(21) Appl. No.: 17/497,126

(22) Filed: Oct. 8, 2021

(65) Prior Publication Data
US 2023/0115862 A1   Apr. 13, 2023

(51) Int. Cl.
*B62M 6/75* (2010.01)
*B62J 1/06* (2006.01)
*B62K 15/00* (2006.01)
*B62K 11/00* (2006.01)

(52) U.S. Cl.
CPC ............... *B62K 15/006* (2013.01); *B62J 1/06* (2013.01); *B62K 11/00* (2013.01); *B62M 6/75* (2013.01); *B62K 2202/00* (2013.01)

(58) Field of Classification Search
CPC .................................... B62J 1/06; B62M 6/75
See application file for complete search history.

(56) References Cited

FOREIGN PATENT DOCUMENTS

| CN | 205150148 U | * | 4/2016 |
| KR | 200408298 Y1 | * | 2/2006 |
| KR | 20110118755 A | * | 11/2011 |
| KR | 101984169 B1 | * | 5/2019 |

* cited by examiner

*Primary Examiner* — Kevin Hurley
*Assistant Examiner* — Hosam Shabara
(74) *Attorney, Agent, or Firm* — John K. Park; PARK LAW FIRM (57) ABSTRACT

The present invention relates to an electric kickboard in which an impact absorbing device is installed, and more particularly, to an electric kickboard including an impact absorbing device to support a weight of a user standing up by allowing the impact absorbing device to sufficiently absorb an impact when a seat is vibrated during riding by using elasticity of springs having different spring constants and including a self-power generating drive at one side thereof to produce electricity using vertical vibrations during riding and accumulate the produced electricity, thereby improving an energy efficiency.

1 Claim, 9 Drawing Sheets

ELECTRIC KICKBOARD INCLUDING IMPACT ABSORBING DEVICE TO SUPPORT WEIGHT OF USER STANDING UP

CROSS-REFERENCE TO RELATED APPLICATIONS

This U.S. non-provisional patent application claims priority under 35 U.S.C. § 119 of Korean Patent Application No. 10-2021-0018502, filed on Feb. 9, 2021, the entire contents of which are hereby incorporated by reference.

BACKGROUND

The present invention relates to an electric kickboard driven by an electric motor, and more particularly, to an electric kickboard including an impact absorbing device capable of distributing a portion of a weight that is applied to a knee or a waist in a standing state.

An electric kickboard is a device including an electric motor therein to move by driving the electric motor using a battery power. A wheel is mounted to a wheel frame, and a deck is prepared on the wheel frame so that a user stands up thereon.

When the electric kickboard is driven in a state in which the user stands up on the deck, the electric kickboard may move forward while the user manipulates to change a speed or a direction thereof.

An impact applied to a human body standing on the deck is absorbed such that the wheel absorbs a portion of an impact generated while moving because the wheel is used as a cushioning material like a vehicle tire, and a separate suspension unit is installed at a portion connecting the wheel and the wheel frame to absorb an impact.

Since the electric kickboard is generally designed for one person to ride thereon, the electric kickboard has a simple structure, a light weight, and a small size. Thus, although the suspension unit is installed between the wheel and the wheel frame, a sufficient impact absorbing function may not be achieved.

Although a high functional suspension unit is installed between the wheel and the wheel frame, an impact applied to a waist or a knee of the user may not be sufficiently absorbed because of the structure of the electric kickboard, i.e., because the user inevitably stands on the electric kickboard.

Particularly, when the user stands up while riding, the impact applied to the knee or the waist may not be sufficiently absorbed due to user load variation generated during moving although the wheel or the suspension unit has an excellent absorbing capacity.

RELATED ART DOCUMENT

Patent Document (Patent document 1) 1. Korean Patent Registration No. 10-1207997 (Nov. 28, 2012)
(Patent document 2) 2. Korean Utility Model Application No. 20-2015-0002771 (Apr. 29, 2015)
(Patent document 3) 3. Korean Utility Model Application No. 20-2015-0006562 (Oct. 6, 2015)

SUMMARY

The present invention provides an electric kickboard protecting a knee or a waist of a user by absorbing an impact force applied to the knee or the waist of the user while riding the electric kickboard through a separately provided impact absorbing device, supporting a weight of the standing user by using a seat so that the user rides easily for a long time, and supporting the weight of the standing user by installing the impact absorbing device capable of preventing excessive shakings and vibrations generated while absorbing the impact by using a coil spring and a fluid pressure at the same time.

The present invention also provides an electric kickboard in which a power generating device is installed at one side thereof and electrically connected to a battery built therein to generate electricity by using vibrations generated while using the electric kickboard and then accumulate the generated electricity in the battery, thereby using the electricity as energy for driving the electric kickboard.

The present invention provides an electric kickboard for supporting a weight of a standing user by installing an impact absorbing device capable of sufficiently absorbing an impact when a seat is vibrated during riding by using elasticity of springs having different spring constants, and producing electricity using vertical vibrations during riding by installing a self-power generating drive at one side thereof and accumulating the produced electricity to improve an energy efficiency.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

As illustrated in FIGS. 1 to 5, an electric kickboard includes a wheel frame WF in which an electrically driven wheel WH is mounted. The wheel frame WF includes a deck FH on which a user stands, and a frame bracket FB is formed on the deck.

A moving bar 130 that is bent in a radial direction when an external force is applied and then restored is formed at an upper end of the frame bracket FB. The moving bar 130 is bent within a range from 0° to 10° in a radial direction when an external force is applied and then restored again. The moving bar 130 is made of a material such as a coil spring or an elastic bar. A seat frame 120 is coupled to an upper end of the moving bar 130, and a seat 110 is coupled to an upper end of the seat frame 120.

Figure 3:
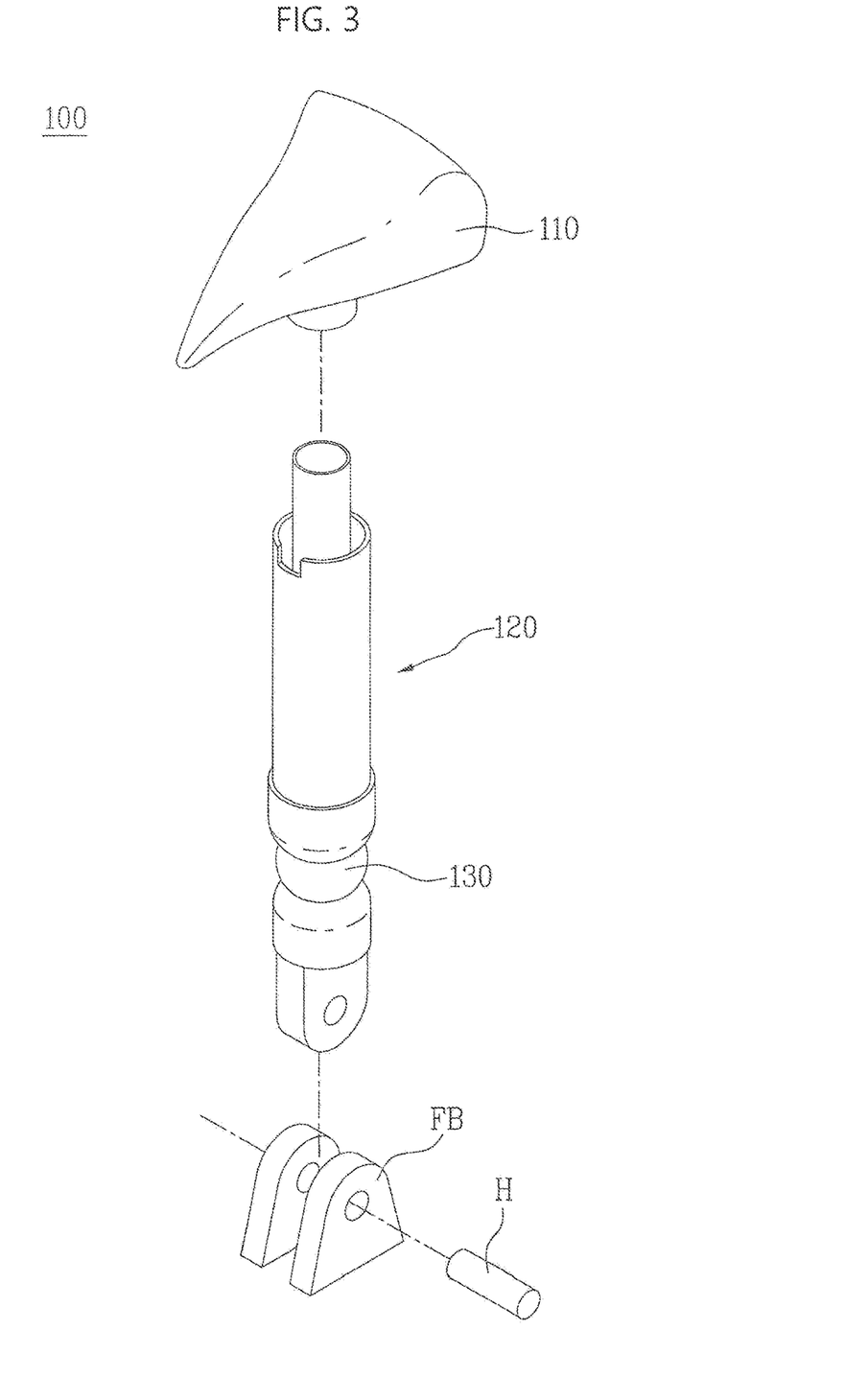
FIG. 3 is an exploded view illustrating an impact absorbing device 100 mounted to the electric kickboard in which the impact absorbing device is installed according to the present invention.

In FIG. 3, an impact absorbing device 100, which is separated from the electric kickboard, is disassembled into the seat 110, the seat frame 120, the moving bar 130, and the frame bracket FB. As illustrated in FIG. 3, the impact absorbing device 100 is formed by sequentially coupling the seat 110, the seat frame 120, the moving bar 130, and the frame bracket FB.

The seat frame 120, as a main component of the impact absorbing device 100, includes a seat bar 121 and a seat frame housing 124.

The seat frame 120 serves to absorb an impact force applied to the seat 110 by a spring built therein.

Figure 4:
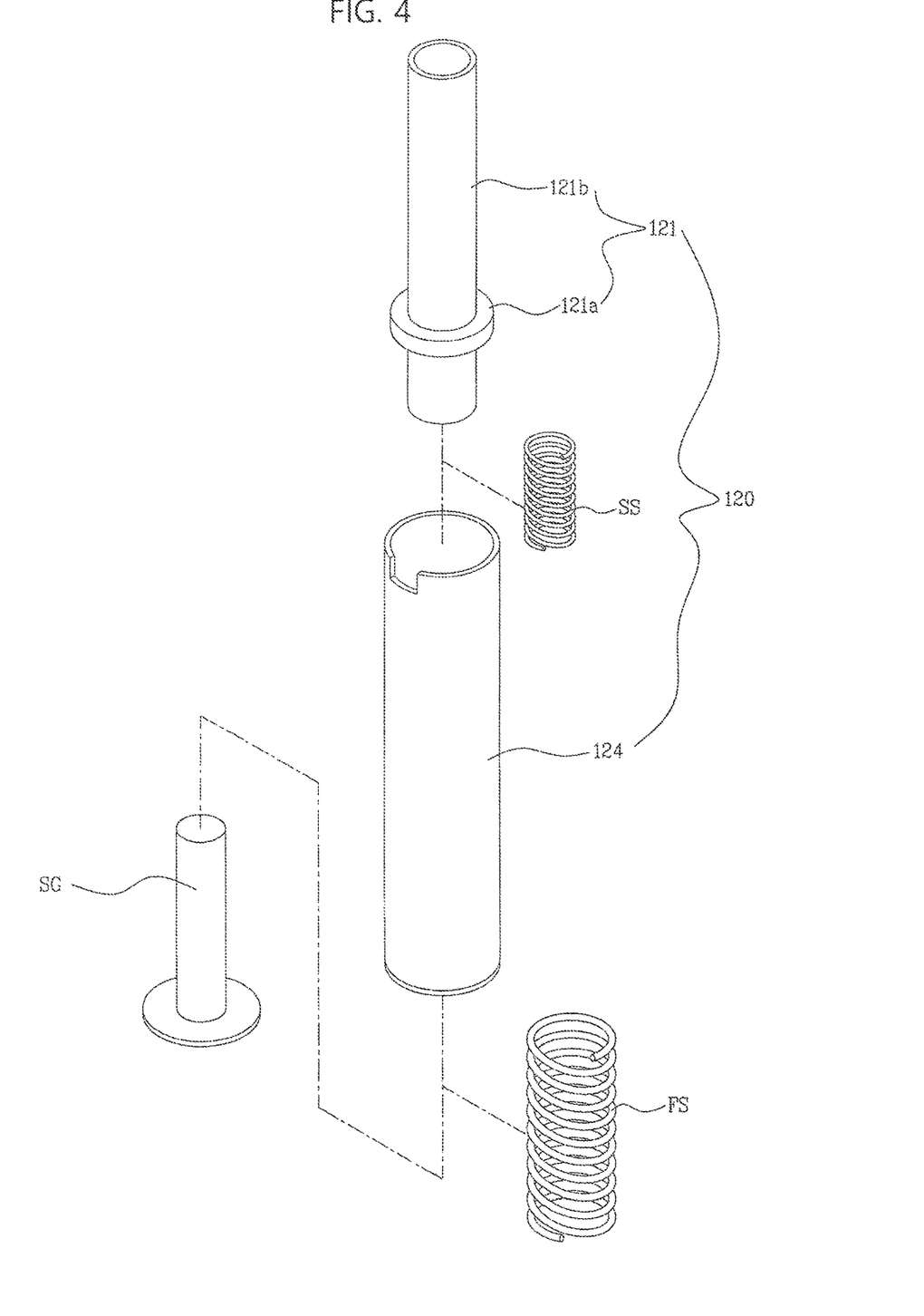
FIG. 4 is an exploded view illustrating a seat frame 120 according to the present invention.
Figure 5:
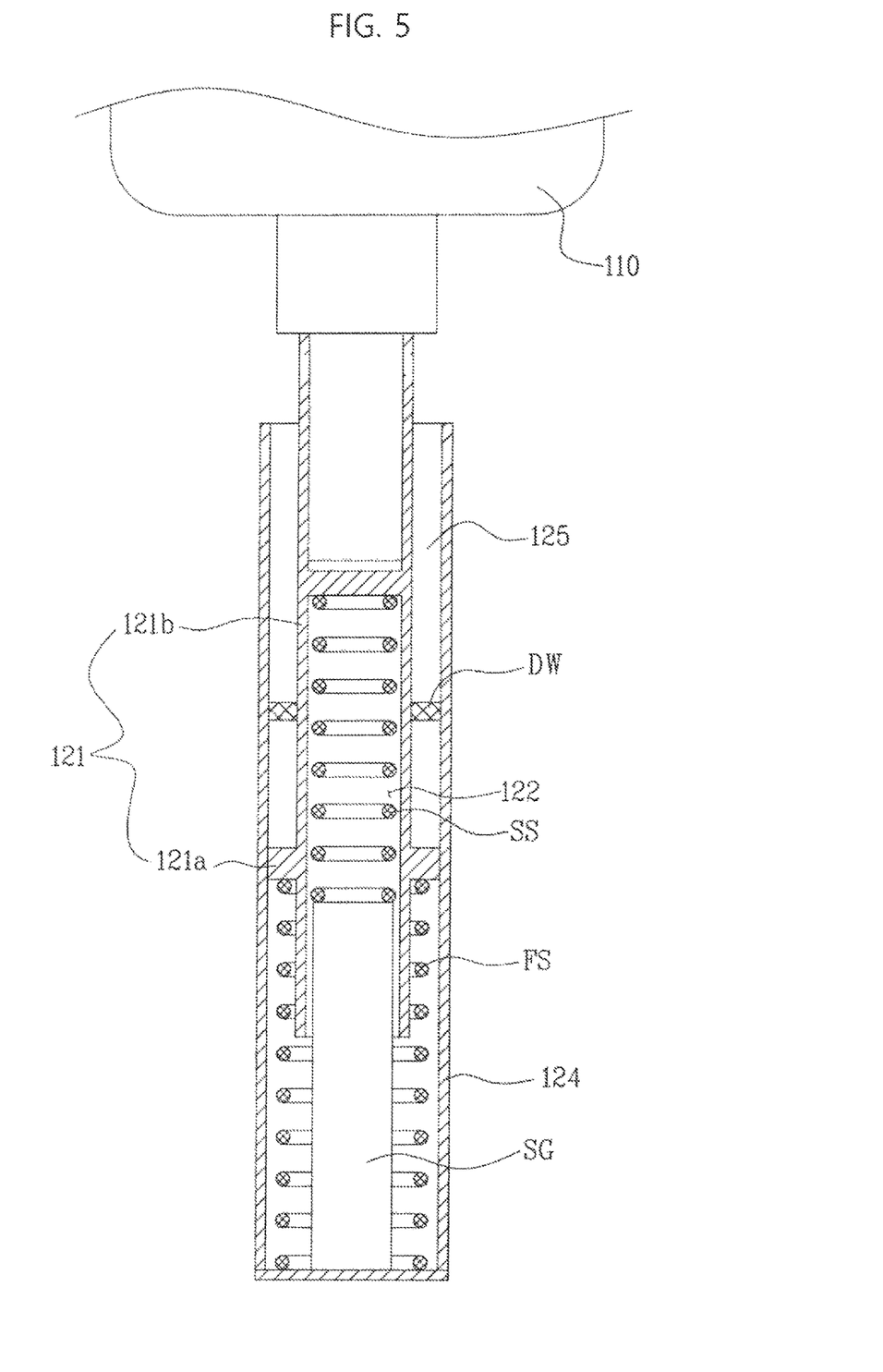
FIG. 5 is a coupling cross-sectional view illustrating the seat frame 120 according to the present invention.
Figure 6:
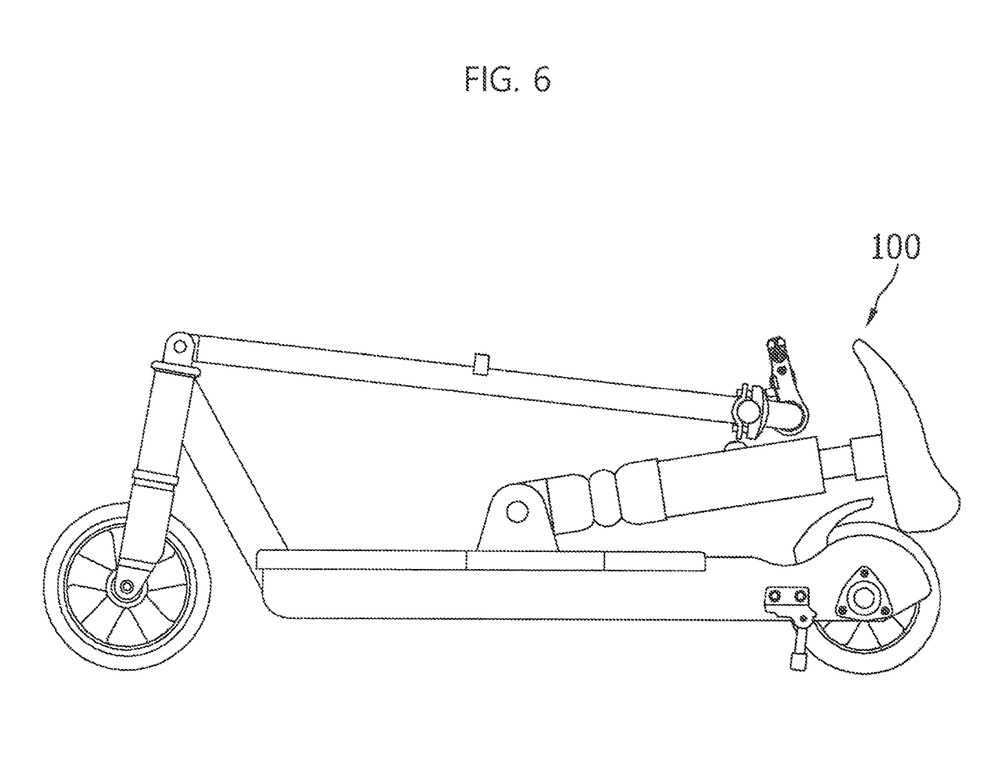
FIG. 6 is a view illustrating the electric kickboard in which the impact absorbing device is folded with respect to a hinge according to the present invention.

As illustrated in FIGS. 4 and 5, the seat frame housing 124 having an empty inner space is provided. The empty inner space is a seat bar mounting chamber 125.

The seat bar 121 and a spring guide SG are disposed in the seat bar mounting chamber 125. Here, the seat bar 121 is assembled to the seat frame housing 124, and the spring guide SG is formed at the moving bar 130. A partition wall DW is formed at an inner wall of the seat frame housing 124.

The seat bar 121 includes a seat bar body 121a and a seat bar support 121b. The seat bar body 121a has an opened hollow lower portion, and a spring mounting chamber 122 is formed in the hollow portion.

A first spring FS is installed in the seat bar mounting chamber 125. The first spring FS is installed to surround the spring guide SG. The first spring is disposed between a bottom of the seat frame housing 124 and a lower end of the seat bar to elastically support the seat bar 121.

The seat bar support 121b is integrated with the seat bar body 121a to move together with the seat bar body 121a when the seat bar body 121a ascends and descends. However, ascending of the seat bar body 121a is restricted as the seat bar body 121a is caught by the partition wall DW.

The first spring FS has a compression amount that is determined when a load is applied to the seat bar 121 according to a spring constant thereof. Since the spring constant decreases as a deflection increases when the same load is applied, a coil spring having a small spring constant is selected in order to sensitively react to load variation, and a coil spring having a great spring constant is selected in order to insensitively react to the load variation.

A second spring SS is installed in the spring mounting chamber 122. The second spring SS elastically supports the seat bar 121 such that an upper end thereof supports an upper end inner wall of the spring mounting chamber 122, and a lower end thereof is supported by an upper end of the spring guide SG.

A compressive force (impact force) applied to the seat bar 121 compresses the second spring SS mounted to the spring mounting chamber 122 as described above and the first spring FS mounted to surround the spring guide SG, and this impact force is absorbed as the first and second springs FS and SS react thereto. The compressive force applied to the seat bar 121 is absorbed by the elastic reaction force generated as described above.

Thus, since the compressive force applied to the seat bar 121 is distributed by the first spring FS and the second spring SS, when the same impact force is applied, a compression length decreases, and a restoration distance also decreases more than a case of using one spring. That is, the compressive force (impact force) may be further smoothly absorb while a vertical vibration decreases than the case of using one spring.

As the spring constant of the second spring SS is designed to be less than that of the first spring FS, when the load applied to the seat bar 121 is initiated, the second spring SS having the small spring constant firstly sensitively reacts to absorb the load, and when the load increases, the first spring FS and the second spring SS are compressed together to distribute the load and then restored.

Also, since the first spring FS and the second spring SS have different spring constants, the spring having a relatively slow reaction speed delays a reaction speed of the spring having a relatively fast reaction speed.

The seat 110 is coupled to an upper end of the seat bar support 121b.

The seat 110 has a shape suitable for supporting a weight of an electric kickboard user who sits on the seat while standing up. The seat 110 is used to be inserted between hips. The weight of the user is applied to the seat 110 through the hips, and then a compressive force is applied to the first spring FS and the second spring SS.

Hereinafter, an operation of the impact absorbing device 100 according to the present invention will be described.

As illustrated in FIGS. 1 to 5, when the user steps on the deck FH installed at both sides of the wheel frame WF, the impact absorbing device 100 fixed at an upper end of the wheel frame WF is inserted between hips and both legs of the user, and the weight of the user is supported by the seat 110, a portion of the weight is loaded to the deck, and the rest of the weight is loaded to the seat 110 formed at the upper end of the impact absorbing device 100.

Figure 1:
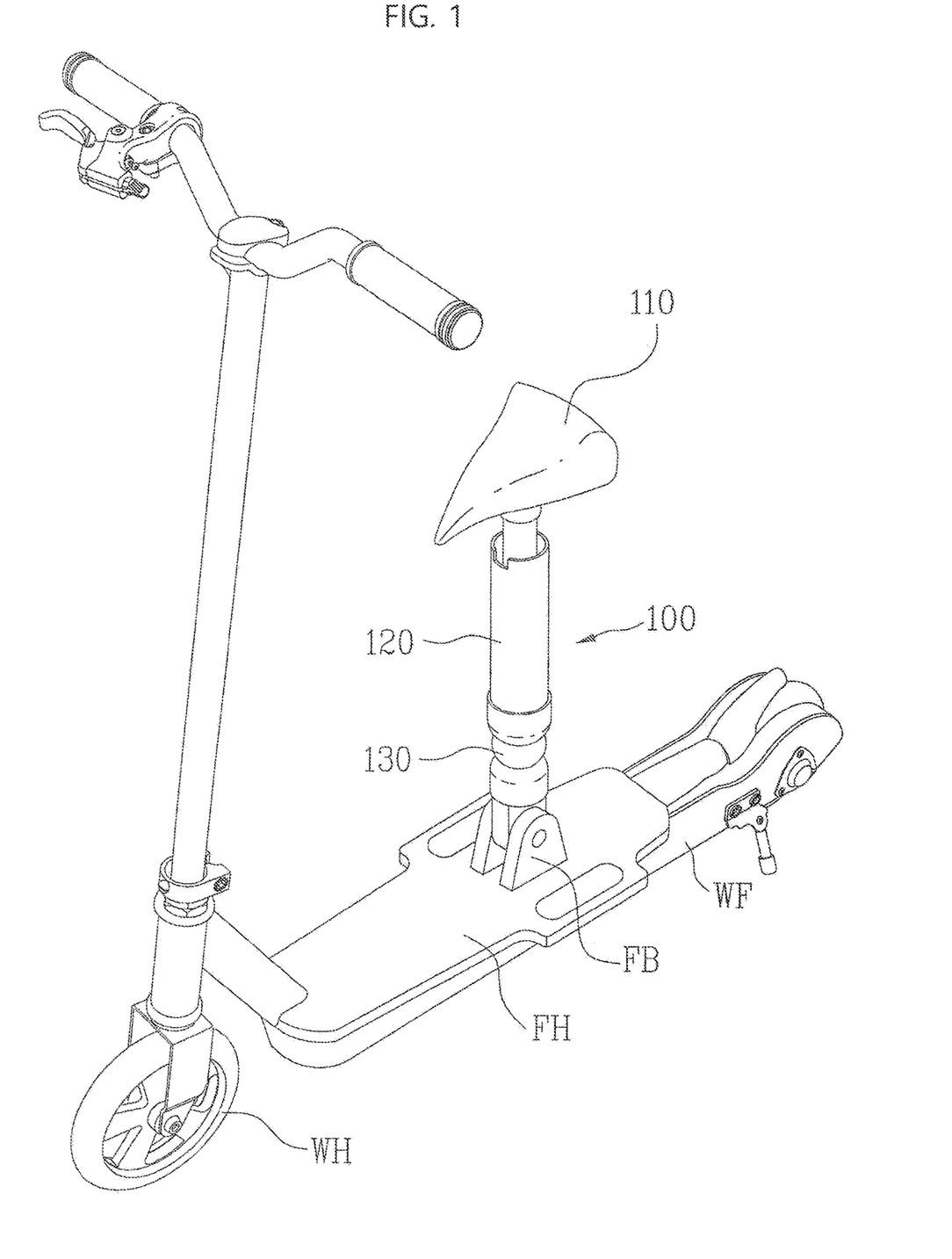
FIG. 1 is a view illustrating an electric kickboard in which an impact absorbing device is installed according to the present invention.
Figure 2:
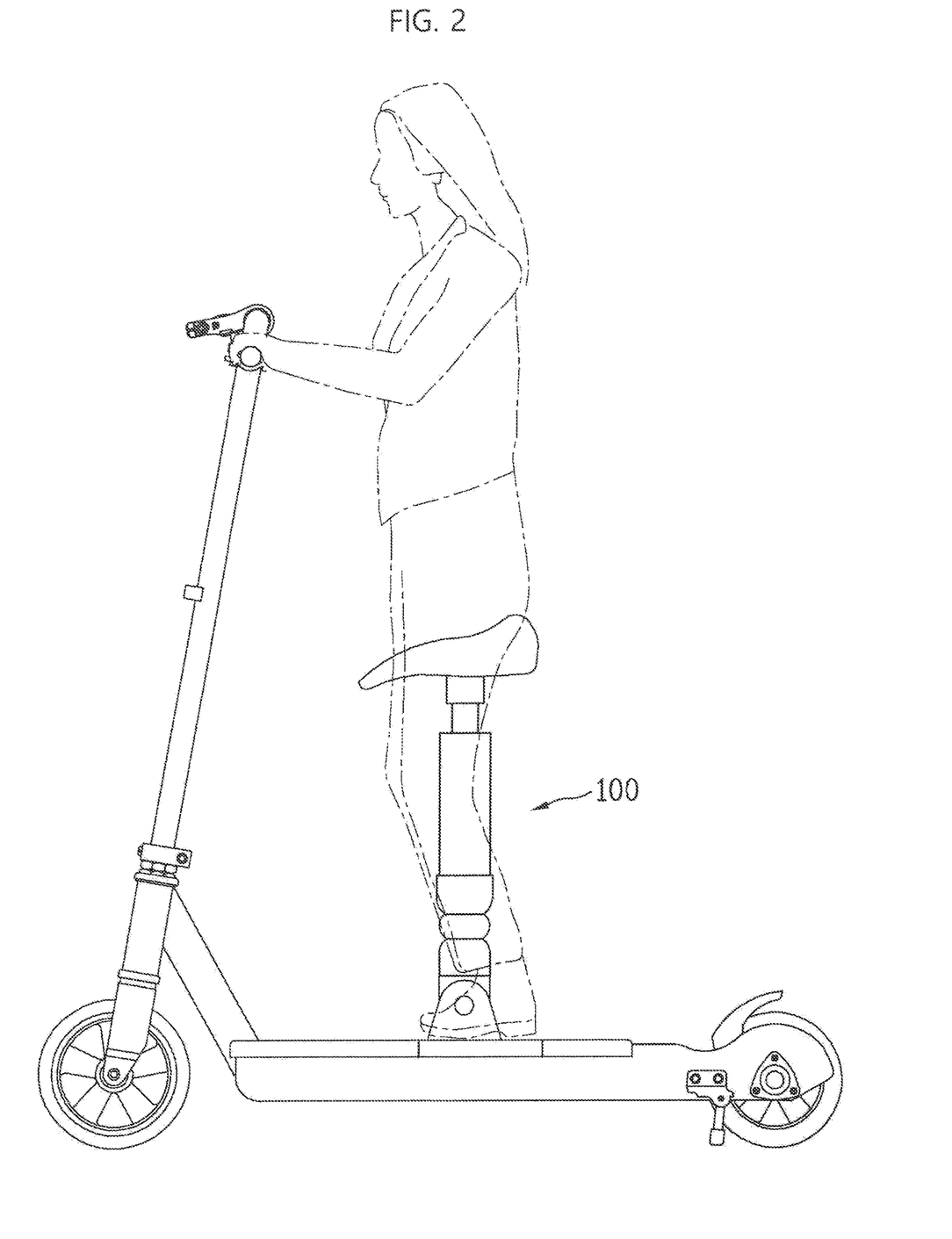
FIG. 2 is a view illustrating a state in which a weight of a user who steps on a deck and stands on a seat of the electric kickboard in which the impact absorbing device is installed is supported according to the present invention.

Here, the seat 110 supports the weight of the user, and although a degree of supporting is varied according to elasticity of the spring, the load applied to a waist or a knee of the user is reduced as much as the elasticity.

Since the weight of the user is loaded only to the deck when the impact absorbing device 100 is not mounted to the wheel frame WF, the weight is concentrated to the knee or the waist. However, when the impact absorbing device 100 is formed, the weight of the user is loaded to the seat 110 formed at the upper end of the impact absorbing device 100, and the loaded weight is distributed by the seat 110.

When the electric kickboard is driven in a state in which the weight is distributed to the deck and the seat 110, the wheel WH rotates and moves forward When the electric kickboard moves forward, the load applied to the seat 110 that supports a portion of the weight is varied by change of a road surface on which the wheel runs, speed change and direction change of the wheel, and shaking of the user standing on the deck. That is, the load applied to the seat 110 is varied many times for a short time less than 1 second. Since the variation of the load applied to the seat may be generated several tens of times even during one second, the seat 110 is shaken left and right directions or vibrated in a vertical direction when the wheel runs.

Since the wheel WH moves forward, an impact force caused by a slight height difference on the road surface or foreign substances existing on the road surface is directly transmitted to the seat 110. Thus, when the wheel runs, the seat momentarily moves in the vertical direction to be vibrated while the wheel runs.

When the impact force is not absorbed when the seat 110 is vibrated in the vertical direction, the impact force transmitted to the seat is directly transmitted to the hips of the user, and since the impact force transmitted to the hips is directly transmitted again to the knees, waist, neck, and head of the user, the user receive the physical impact as much.

That is, when the strong impact force transmitted to the seat 110 is not absorbed, the user may be hurt and receive a stress due to repeated strong impacts to feel a sense of fatigue.

However, since the seat 110 smoothly absorbs the impact force, the physical impact applied to the user may be relieved, and the stress may be prevented.

Hereinafter, a process of absorbing the impact force applied to the seat 110 while the wheel is driven will be described. The impact force applied to the wheel WH is transmitted to the seat 110 through the wheel frame WF, the frame bracket FB, the moving bar 130, and the seat bar 121.

When the wheel WH meets a descending stepped portion while passing a road surface, the entire electric kickboard moves down, but the human body on the seat 110 momentarily floats and is dropped with an accelerating force due to the gravity to apply greater load to the seat than that before passing the stepped portion.

When the great load is applied to the seat, as the seat bar 121 is pressed, the first spring FS is compressed, and the second spring SS is simultaneously compressed to momentarily absorb the load.

Since the moving bar 130 may be restored by moving by 0° to 10° in all radial directions due to flexibility thereof, when eccentricity is generated when the direction or speed of the electric kickboard is changed, the moving bar 130 is restored by elastically moving in the radial direction to allow smooth riding.

As described above, when the impact force arrives at the seat 110 as the wheel WH moves forward, the impact is absorbed as the seat bar 121 simultaneously compresses the first spring FS and the second spring SS.

Thus, since riding in a state in which the weight is loaded to the seat while standing up is possible, riding the electric kickboard is not difficult even for a long time riding, and the impact force applied to the knees, the waist, or the neck is remarkably reduced to allow comfortable riding.

Figure 7:
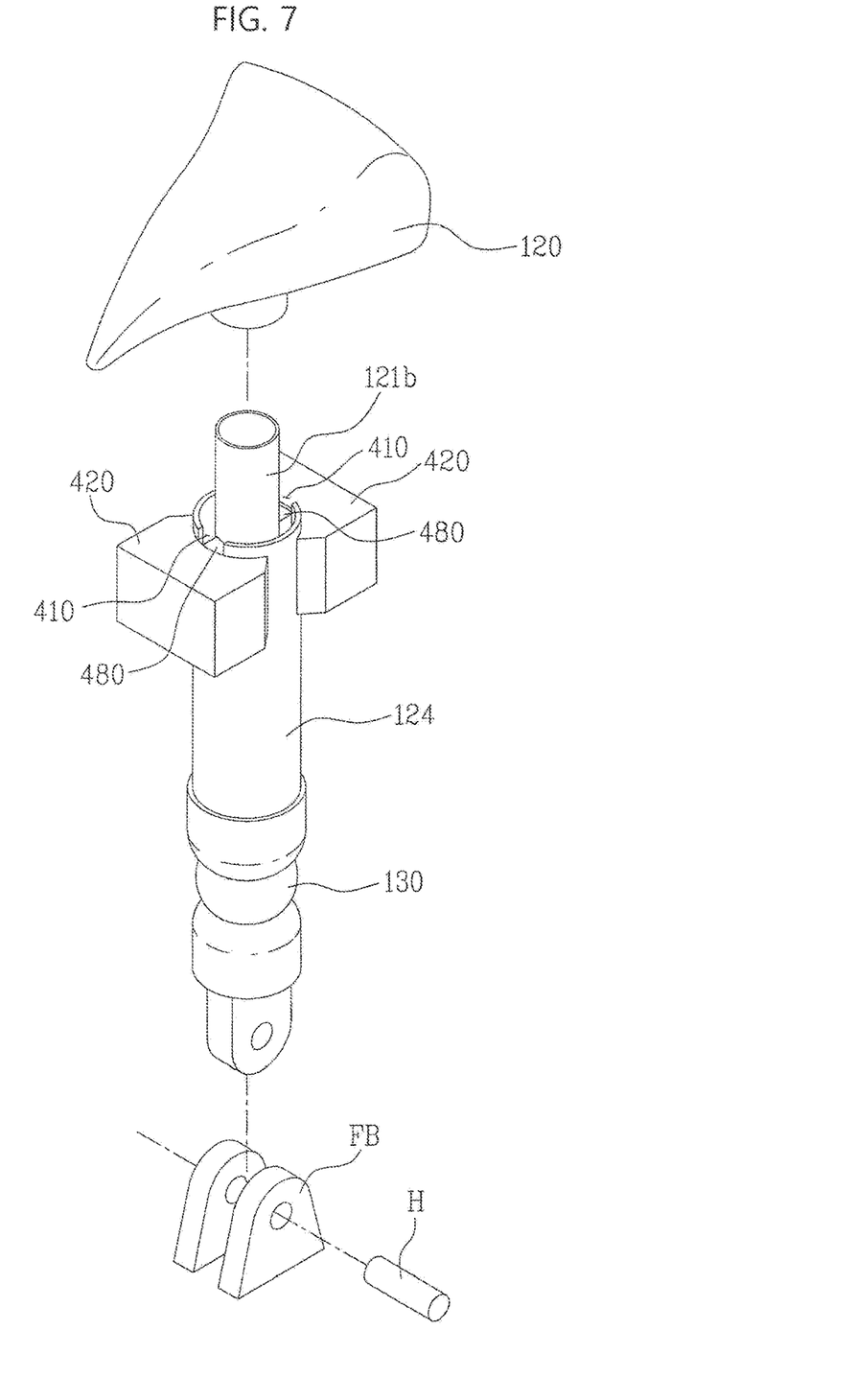
FIG. 7 is a view illustrating a state in which a self-power generating device is installed on a seat frame 120 of an electric kickboard according to another embodiment of the present invention.
Figure 8:
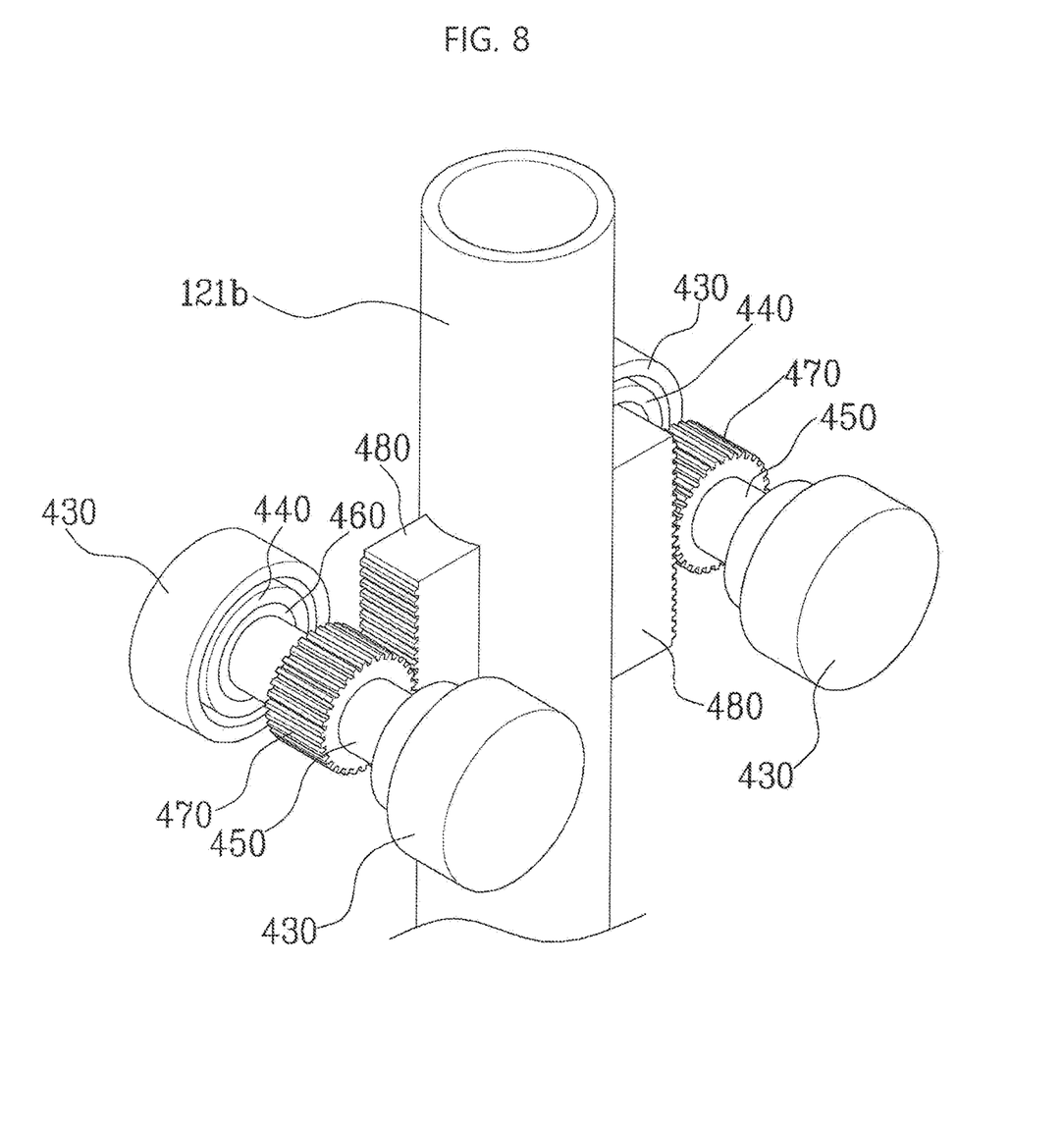
FIG. 8 is a view specifically illustrating a main portion of the self-power generating device.
Figure 9:
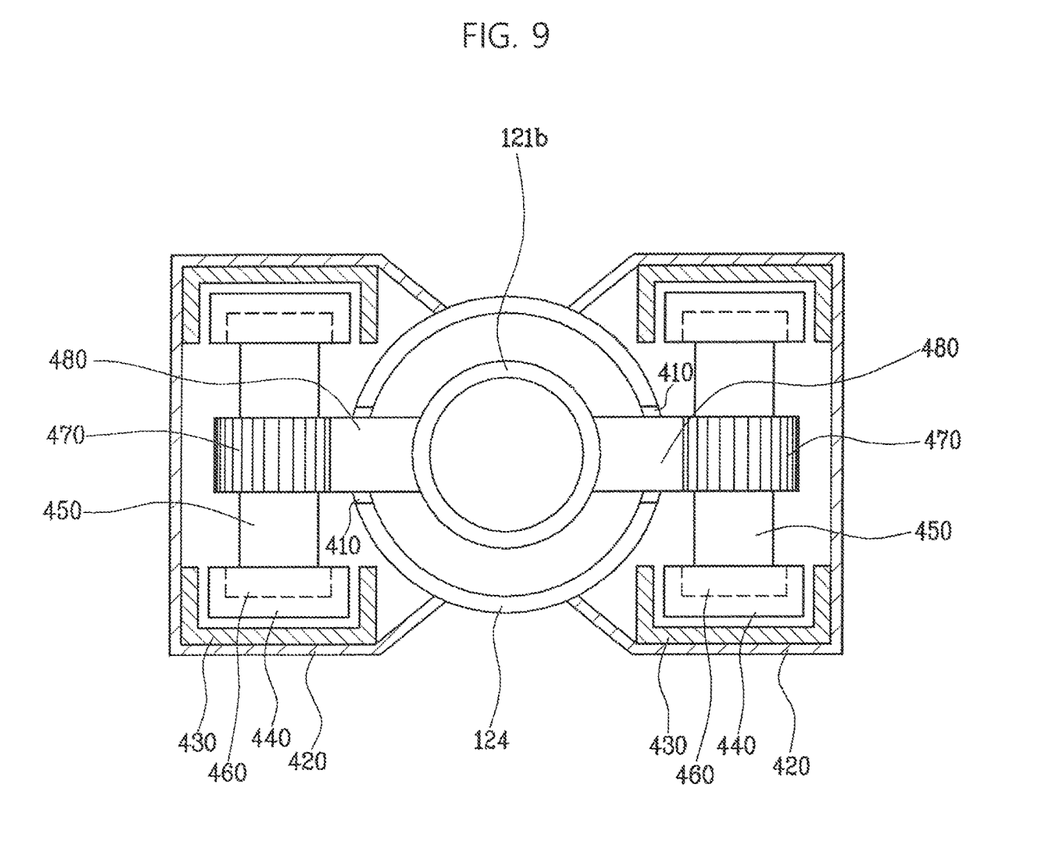
FIG. 9 is a cross-sectional view illustrating a state in which the self-power generating device is installed according to the present invention.

FIGS. 7, 8, and 9 are views illustrating a state in which a self-power generating device using a weight of a user is installed on a seat frame housing 124 according to another embodiment of the present invention.

One pair of rack moving grooves 410, which face each other, are opened in a longitudinal direction at upper end both sides of the seat frame housing 124. Stator bodies 420 are coupled to an outer surface of the seat frame housing 124 so as to be disposed at central portions of the rack moving grooves 410 Each of the stator bodies 420 has a rounded inner surface so as to closely attach the cylindrical seat frame housing 124, and a stator 430 around which a coil is wound is formed at each of inner both sides of each of the stator bodies 420.

Rotators 440 are rotatably installed to the stators 430, respectively, and the rotators 440 are coupled with each other in an integrated manner by a rotation shaft 450.

An one-way gear 460 transmitting a load only when rotates in a forward direction and rotating idly when rotates in a reverse direction is formed between the rotation shaft 450 and the rotator 440.

A pinion gear 470 is formed at a central portion of the rotation shaft 450, and a rack gear 480 engaged with the pinion gear 470 is formed at each of both side surfaces of a seat bar support 121*b*.

The self-power generating device is electrically connected with a built-in battery to supply and accumulate generated electricity to the battery.

The seat bar support 121*b* is vertically vibrated when the user of the electric kickboard operates the electric kickboard to move in a state in which the user sits on the seat 110 while standing up, and a pressing force is repeatedly applied in proportion to the load of the user whenever vibrated because the weight is loaded to the seat 110.

When the seat bar support 121*b* descends, the pinion gear 470 engaged with the rack gear 480 formed at the seat bar support 121*b* rotates. When the pinion gear 470 rotates, the rotator 440 rotates through the rotation shaft 450, and since the rotator 440 rotates in the stator 430, electricity is generated by electromagnetic induction.

When the seat bar support 121*b* ascends, the pinion gear 470 engaged with the rack gear 480 reversely rotates. When the pinion gear 470 reversely rotates, a load is not loaded to the rotator 450 because the pinion gear 470 rotates idly by the one-way gear 460 disposed between the rotation shaft 450 and the rotator 440. As described above, the rotator 440 rotates to produce electricity only when the seat bar support 121*b* descends.

The generated electricity is supplied to the battery built in the electric kickboard to be used or accumulated. As described above, since the electricity is produced and accumulated by the self-power generating device, a driving distance of the electric kickboard remarkably increases further than a case of using only the battery built in the electric kickboard.

According to the present invention, the impact absorbing device capable of supporting the weight of the user who stands up is installed to appropriately absorb the impact applied to the knee or the waist of the user while riding the electric kickboard, and the seat elastically absorbs shakings or vibrations generated when the electric kickboard is driven to support the weight of the user, thereby remarkably reducing the impact applied to the user through the seat.

Also, since the self-power generating device is mounted, electricity may be continuously produced during riding, and the produced electricity may be supplied to and accumulated in the battery built tin the electric kickboard.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An electric kickboard comprising a self-power generating device to support a weight of a user standing up, comprising:
   a wheel frame (WF) to which an electrically driven wheel (WH) is mounted;
   a frame bracket (FB) coupled onto a deck (FH) that is coupled onto the wheel frame;
   a moving bar (130) that is coupled to an upper end of the frame bracket, bent in a radial direction when an external force is applied and then restored, and comprises a spring guide (SG) vertically formed at a central portion thereof;

a seat frame housing (124) that is detachably coupled to the moving bar and hollow in a longitudinal direction thereof so that a seat bar mounting chamber (125) is formed therein;

a seat bar (121) comprising a seat bar body (121*a*) and a seat bar support (121*b*), wherein the seat bar body (121*a*) is inserted to the seat bar mounting chamber (125) to vertically vibrate according to load variation caused by movement in the seat bar mounting chamber, and the seat bar support (121*b*) protrudes to the outside of the seat bar mounting chamber (125);

a first spring (FS) inserted between the moving bar (130) and the seat bar (121) to elastically support the seat bar (121) while surrounding the spring guide (SG);

a second spring (SS) inserted between the seat bar (121) and an upper end of the spring guide (SG) to elastically support the seat bar (121) and having a spring constant different from that of the first spring;

a seat (110) coupled to an upper end of the seat bar support (121*b*);

a rack moving groove (410) formed at each of both sides of the seat frame housing (124);

a stator body (420) that is disposed at a central portion of the rack moving groove (410), coupled to each of the both sides of the seat frame housing (124), and comprises one pair of stators (430) therein;

a rotator (440) rotatably installed to each of the stators (430);

a rotation shaft (450) configured to connect the rotators with each other in an integrated manner;

an one-way gear (460) disposed between the rotation shaft (450) and the rotator (440) to transmit a load only when the rotation shaft (450) rotates in a forward direction and rotate idly when the rotation shaft (450) rotates in a reverse direction;

a pinion gear (470) disposed at a central portion of the rotation shaft (450); and a rack gear (480) disposed at each of both sides of the seat bar support (121*b*) so as to be engaged with the pinion gear (470).

* * * * *